United States Patent [19]

Princen et al.

[11] 4,176,200

[45] Nov. 27, 1979

[54] METHOD FOR REDUCING THE SURFACE DISCOLORATION OF FOOD SPREADS AND FOOD SPREADS PRODUCED THEREBY

[75] Inventors: Henricus M. Princen, Englewood, N.J.; Michael P. Aronson, Valley Cottage, N.Y.

[73] Assignee: Lever Brothers Company, New York, N.Y.

[21] Appl. No.: 834,604

[22] Filed: Sep. 19, 1977

[51] Int. Cl.$^2$ .................. A23L 1/275; A23D 5/04
[52] U.S. Cl. .................. 426/250; 426/540; 426/604; 426/613
[58] Field of Search .............. 426/250, 540, 603, 604, 426/582, 585, 613

[56] References Cited

U.S. PATENT DOCUMENTS

| | | | |
|---|---|---|---|
| 2,646,355 | 7/1953 | Zweifel | 426/250 |
| 3,162,538 | 12/1964 | Todd et al. | 426/540 |
| 3,322,545 | 5/1967 | Siehrs | 426/540 |
| 3,366,492 | 1/1968 | Voss et al. | 426/603 |
| 3,579,356 | 5/1971 | Miller | 426/540 |
| 3,592,940 | 7/1971 | Quesada | 426/540 |
| 3,836,683 | 9/1974 | Hoos | 426/582 |
| 3,940,504 | 2/1976 | Jackel | 426/540 |

*Primary Examiner*—Jeanette M. Hunter
*Attorney, Agent, or Firm*—Kenneth F. Dusyn; Ira J. Schultz

[57] ABSTRACT

Surface discoloration of water-in-oil emulsion type food spreads such as margarines can be reduced by incorporating into the fat or water phase of the spread a substance which makes the optical properties of the spread, when dehydrated, comparable to the optical properties of a freshly prepared spread. Titanium dioxide may be used for this purpose at levels as low as 0.1% by weight of the spread.

8 Claims, No Drawings

METHOD FOR REDUCING THE SURFACE DISCOLORATION OF FOOD SPREADS AND FOOD SPREADS PRODUCED THEREBY

FIELD OF THE INVENTION

This invention relates to the field of fat-containing products known as margarines and/or food spreads.

Margarines are water-in-oil emulsions in which an aqueous phase is present as droplets distributed within a continuous matrix of oil and fat and are usually manufactured to resemble butter in appearance. The Food and Drug Administration requires that margarine contain at least 80% fat (Code of Federal Regulations, 21 CFR 166.110). Similar products having lower fat content are commonly sold under such designations as "light margarine," "imitation margarine," or "food spread." For the purposes of defining the invention herein, the term "food spread" will include all such edible, water-in-oil emulsions that are soft or spreadable solids at room temperature and have a fat content of at least about 40%. Margarines within the context of the aforementioned FDA requirements are encompassed by this definition. These food spread products generally contain salt, such as sodium chloride, and milk solids in the water phase to impart flavor, and emulsifier and dye in the fat phase. A dye, usually beta-carotene, is added to impart to the spread a yellow color, in order to liken its appearance to that of butter. Preservatives, such as butylated hydroxytoluene, sodium benzoate, and potassium sorbate may also be incorporated into the food spread, as well as other flavorings.

When a food spread is imperfectly wrapped or not hermetically sealed, or is uncovered by the consumer, there will be an exposure of the product to the atmosphere for a period of time, whereupon water evaporates from the surface of the spread, and the surface layer darkens in color. The consumer often confuses this discoloration with product spoilage, which it does not represent. Nevertheless, this surface darkening is considered by the average consumer to be objectionable and unsightly. While applicant does not wish to be limited or restricted to any particular theory, two mechanisms are thought to be involved in the discoloration of the food spread occasioned by its exposure to the atmosphere.

First, evaporation of water from the surface layer of the spread causes an increase in the concentration of the other constituents of that layer, including but not limited to the dye. If $\phi$ is the initial volume fraction of water in the spread, the percentage increase (X) in dye concentration upon evaporation of all the water can be expressed by the formula:

$$X = \frac{\phi}{1 - \phi} \times 100\%$$

Thus, if the initial water concentration of the spread is 15% by volume, the maximum increase in dye concentration is 18%. If the initial water concentration is 40% by volume, the maximum increase in dye concentration is 67%. Thus, in a situation where spreads initially contain large amounts of water, the potential exists for a large increase in dye concentration, and hence, a significant change in color.

The second mechanism thought to be involved in the discoloration precess is the loss of water droplets, which serve as light-scattering centers, through evaporation. Their loss causes the food spread to appear darker and glassy. This phenonemon may, in fact, be the dominant mechanism in causing the surface darkenig of the product.

DESCRIPTION OF THE INVENTION

It has now been discovered that the darkening or discoloration of the surface of a food spread, which results from a loss of water to the atmosphere, can be reduced by incorporating into the spread a substance which makes the optical properties of the spread, when dehydrated, comparable to the optical properties of a freshly made food spread. Such a substance may be incorporated directly into the fat phase of the spread or, alternatively, into the water phase. Typically, such a substance need not cause a substantial or even a perceptible change in the initial color of the food spread when freshly made. Indeed, an appreciable change in the initial color would be undesirable. However, by incorporation of such a substance into the fat or water phase of the spread, the resistance to color change of the end product becomes evident.

In the production of the spreads, according to the invention herein, white pigments have been found to be effective in preventing the discoloration of the spreads. Any food-grade white pigment suitable for food use may be employed, examples being titanium dioxide and calcium carbonate. Titanium dioxide is preferred since its high index of refraction (2.6-2.9) makes possible the use of lower concentrations, for example, as little as 0.05% by weight of the food spread may be used. However, depending on the substance used, an effective amount to prevent the discoloration in question is all that is required. No upper limit can be given in terms of the substances to be used although it is very desirable to keep the amounts of the substance relatively low so that other properties of the spreads, such as, but not limited to, texture, taste, mouth feel, etc., will not be affected. A desirable range for the concentration of the substance to be incorporated into the spread will be from about 0.05%–0.1% to about 1% be weight, based on the total weight of the spread.

Titanium dioxide is a known food additive, its use having been authorized by the Food and Drug Administration (21 CFR 73.575). The maximum permissible concentration for titanium dioxide in a food product is 1% by weight. The use of titanium dioxide in Mozzarella cheese is described in 52 J. Dairy Science 968 (1969). U.S. Pat. Nos. 3,579,356 and 3,592,940 disclose its use in food emulsions. These patents, however, describe the use of titanium dioxide as a whitener in emulsions of comparatively low fat content, such as liquid coffee lighteners. Liquid coffee lighteners would not experience surface discoloration as they do not have a solid surface constantly exposed to the atmosphere. No disclosure is made of margarine or food spreads or the problems of surface discoloration thereof.

The food spreads of the instant method may be prepared by any conventional process. Generally, this involves forming a mixture of edible oils and/or fats with an edible emulsifier such as mono- and di-glycerides of fatty acids, lecithin or sodium monostearin sulfoacetate, and if desired, a dye. An aqueous base is formed containing such ingredients as salt, for example sodium chloride, and non-fat milk solids, which is then emulsified into the foregoing oil mixture or oil phase at a temperature at which the mixture takes the form of a liquid, preferably from about 40° C. to about 42° C. The substance according to the instant method, for example, titanium dioxide, can be incorporated into the food spread by way of the oil phase or aqueous phase. When incorporated into the oil phase, an oil dispersible substance or an oil dispersible version of the pigment is preferred, and may be blended directly with the ingredients making up the oil phase.

When it is desired to incorporate the substance into the aqueous phase of the spread, a water dispersible substance according to the method herein (for example, a water dispersible titanium dioxide) is referably used. However, because the aqueous phase frequently contains salt as a flavoring ingredient, for example sodium chloride, care must be taken to prevent coagulation of the substance or pigment by the salt, which can occur if the salt concentration is greater than the critical coagulation concentration. The critical coagulation concentration is defined as the minimum concentration of electrolyte necessary to produce coagulation of the substance or pigment, and is readily determined by those skilled in the art. In order to overcome this problem, which can lead to processing difficulties but will not necessarily affect the resistance of the final product against discoloration, the substance or pigment is suspended in a portion of the aqueous phase whose salt content is below the critical coagulation concentration of the substance. This portion, as well as the remaining portion of the aqueous phase (whose salt content is above the critical coagulation concentration), is emulsified in the oil phase or oil mixture. As long as the total volume of the aqueous phase is held constant, the volumes of each portion may be as small or large as is practical to accommodate the incorporation of the respective pigment and salt.

The newly formed emulsion is then pumped through a scraped-surface heat exchanger, such as a Votator, a description of which can be found in "Industrial Oil and Fat Products," Bailey, 3rd ed., p. 1066, Interscience Publishers, Inc., 1964. If a slightly aerated product is desired, a gas such as nitrogen or air can be introduced into the emulsion prior to reaching the heat exchanger. The emulsion is supercooled in the cooler of the Votator and leaves the cooler (referred to as the "A" unit) in a partially crystallized state. It is then passed through the mixer of the Votator (referred to as the "B" unit), where further crystallization of the fat takes place. The emulsion leaving the mixer is run into containers serving as molds and tempered to a firm, shaped mass. Preferably, the tempering is carried out at a temperature of about 7° to 10° C., and for a period of about 24 hours, but may be carried out at room temperature, if desired.

Food spreads produced by the instantly described method will comprise at least about 40% fat, oil or mixtures thereof, 0.1% to 2% of an emulsifier, an effective amount of a substance, such as white pigment, which causes the optical properties of the spread, when dehydrated, to be comparable to the optical properties of a freshly-made spread, and the balance water. When titanium dioxide is used as this substance, it should be present at a level of at least about 0.05% preferably 0.1% by weight of the spread.

Having described our method and its resultant product, the following embodiments are designed to exemplify, but not to limit the practice of our method.

Samples of food spread with and without titanium dioxide were prepared by conventional methods and stored in Petri dishes 3 inches in diameter and ¼ inch deep. The spreads were aged for periods of time, ranging from 22 to 120 hours, in a constant temperature-humidity chamber designed to simulate low humidity storage. Reflectance values were measured before and after storage of the spreads with an XL-10 Gardner Color Difference Meter. To characterize the appearance of the surface of the sample, a yellowness index Y was calculated by the following equation:

$$Y = 142.9 B_L / L$$

wherein Y is the yellowness index; L is a measure of the reflectance of the sample averaged over all wavelengths of white light; and $B_L$ is a measure of the reflectance of yellow light. A detailed description of this type of optical measurement may be found in Hunter, *The Measurement of Appearance*, p. 163, John Wiley, 1975. For a given sample, then, the change in yellowness index after a sample's exposure to the atmosphere is a measure of the degree of discoloration.

The change in surface appearance of the same food spread samples was also rated visually by a panel of observers. After exposure of the samples to the atmosphere, part of the surface was scraped with a spatula to expose the underlying spread. The contrast between scraped and unscraped areas of each sample was then compared with the contrast of a similarly stored and scraped control sample that did not contain titanium dioxide. The results of the foregoing instrumental and visual comparisons appear in Tables 1 to 4 below.

EXAMPLE 1

A food spread was made with the following ingredients:

|  | % by weight |
|---|---|
| Partially hydrogenated palm and soybean oils (fat phase) | 59.43 |
| Water | 37.12 |
| Salt (sodium chloride) | 2.63 |
| Emulsifier[a], dye[b], preservative[c], flavor[d] | 0.77 |
|  | 100.00% |

[a] mono- and di-glycerides of $C_{12}$-$C_{20}$ fatty acids (Myverol E6, supplied by Kodak Chemical Products Company) and lecithin
[b] beta-carotene
[c] potassium sorbate
[d] non-fat milk solids

EXAMPLE 2

Food spreads similar to those of Example 1 were prepared, incorporating varying levels of titanium dioxide in the aqueous phase with a corresponding decrease in the water content of the food spread. Samples of these spreads were aged and rated as in Table 1. Levels of dye are based on the weight of the fat phase. Visual ratings are: 0—no perceptible difference between sample and control; (+)—significant improvement over control; and (++)—very significant improvement over control (little or no discoloration).

Two food grade samples of titanium dioxide were supplied by H. Kohnstamm Company under the trade names:
Atlas White (oil dispersible) = A
Kowet (water dispersible) = K Table 1

Discoloration Tests of Food Spreads with TiO₂ In the Aqueous Phase

| Type | TiO₂ in Spread | Dye Level (ppm) | % RH[c] | Temperature | Time (hr) | Yi[a] | ΔY[b] | Visual Rating |
|---|---|---|---|---|---|---|---|---|
| — | — | 5,500 | 20 | 20° C. | 120 | 68.8 | 9.3 | — |
| K | 0.2 | " | " | " | " | 68.2 | 6.5 | (+) |
| " | 0.3 | " | " | " | " | 68.3 | 3.6 | (+) |
| " | 0.4 | " | " | " | " | 66.3 | 3.0 | (++) |
| — | — | 8,800 | 0 | 25° C. | 72 | 69.1 | 14.9 | — |
| A | 0.2 | " | " | " | " | 66.2 | 10.4 | (+) |
| K | 0.2 | " | " | " | " | 65.1 | 11.6 | (+) |
| — | — | 5,500 | 0 | 25° C. | 22 | 67.7 | 9.7 | — |
| K | 0.05 | " | " | " | " | 68.0 | 9.0 | (0) |
| " | 0.1 | " | " | " | " | 68.3 | 8.0 | (+) |
| " | 0.2 | " | " | " | " | 68.6 | 5.4 | (+) |

[a]Yi is initial value of the yellowness index.
[b]ΔY is increase in yellowness index at end of exposure to atmosphere.
[c]% relative humidity.

EXAMPLE 3

The food spread according to Example 2 were prepared except that varying levels of titanium dioxide were incorporated in the aqueous phase by suspending the titanium dioxide in half the aqueous phase (which was salt free) and dissolving all of the salt in the remaining portion of the aqueous phase. The two portions were sequentially emulsified. The results of the discoloration tests are given in Table 2 below.

Table 2

Discoloration Tests of Food Spreads With TiO₂ in the Aqueous Phase

| Type | % TiO₂ | Dye Level | % RH | Temperature | Time (hr) | Yi | ΔY | Visual Rating |
|---|---|---|---|---|---|---|---|---|
| — | — | 8,800 | 0 | 25° C. | 22 | 70.2 | 13.2 | — |
| K | 0.2 | 8,800 | 0 | 25° C. | 22 | 68.1 | 10.2 | (+) |
| " | 0.4 | 8,800 | 0 | 25° C. | 22 | 66.3 | 9.2 | (++) |

Yi = initial value of yellowness index
ΔY = increase in yellowness index at end of exposure to atmosphere
%RH = relative humidity

EXAMPLE 4

Food spreads similar to those of Example 1 were prepared, except that varying levels of TiO₂ were incorporated into the fat phase of the spread with a corresponding decrease in the level of the fat phase. The results of the discoloration tests are given in Table 3 below.

Table 3

Discoloration Tests of Food Spreads With TiO₂ Dispersed in the Fat Phase

| Type | % TiO₂ | Dye Level | % RH | Temperature | Time (hrs) | Yi | ΔY | Visual Rating |
|---|---|---|---|---|---|---|---|---|
| — | — | 5,500 | 0 | 26° C. | 22 | 67.7 | 9.7 | — |
| A | 0.05 | 5,500 | 0 | 26° C. | 22 | 68.0 | 9.5 | 0 |
| A | 0.1 | 5,500 | 0 | 26° C. | 22 | 68.3 | 9.1 | 0 |
| A | 0.2 | 5,500 | 0 | 26° C. | 22 | 68.6 | 7.4 | + |
| A | 0.4 | 5,500 | 0 | 26° C. | 22 | 66.1 | 6.8 | ++ |
| — | — | 5,500 | 0 | 26° C. | 23 | 68.0 | 9.5 | — |
| A | 0.2 | 5,500 | 0 | 26° C. | 23 | 67.1 | 6.5 | + |
| A | 0.4 | 5,500 | 0 | 26° C. | 23 | 66.0 | 3.9 | ++ |

Yi = initial value of the yellowness index
ΔY = increase in yellowness index at end of exposure to atmosphere
%RH = relative humidity

EXAMPLE 5

Samples of food spreads similar to Example 1, prepared with 0 and 0.4% titanium dioxide incorporated into the aqueous phase, were spread on glass slides and stored at 20° C./20% relative humidity. Microscopic examination showed that water droplets disapeared at about the same rate for samples with and without titanium dioxide. However, samples without titanium dioxide became dark in color and lost their light reflectivity, while those with titanium dioxide retained their light reflectivity and had almost the same appearance as a freshly prepared food spread.

EXAMPLE 6

The water loss of samples of food spreads, prepared with 0, 0.4% and 1.0% titanium dioxide, was observed using a microbalance. At 20° C./20% relative humidity, the rates of loss of water from samples with titanium dioxide were identical to those of samples without titanium dioxide. The samples without titanium dioxide became dark; those with titanium dioxide remained light in appearance.

Examples 5 and 6 show that titanium dioxide does not significantly affect the rate of water loss from food spreads. The reduction in discoloration, therefore, is not due to retardation of evaporation of water.

What is claimed is:

1. A method for reducing the discoloration of the surface of a margarine-like, water-in-oil emulsion food spread comprising at least about 40% fat or oil, or mixtures thereof, occasioned by the evaporation of water therefrom, comprising the step of incorporating into the food spread an amount of good grade white pigment effective to cause the optical properties of said food spread when deydrated, to be comparable to the optical properties of a freshly made food spread.

2. The method of claim 1 wherein said white pigment is titanium dioxide.

3. The method of claim 2 wherein said pigment is incorporated into the spread in an amount of from about 0.05% to about 1%.

4. The method of claim 1 wherein the pigment is incorporated into the oil phase of said food spread.

5. The method of claim 1 wherein the pigment is incorporated into the aqueous phase of said food spread.

6. The method of claim 5 wherein the pigment is incorporated into the food spread by suspending the pigment in a portion of the aqueous phase whose salt content is below the critical coagulation concentration of the pigment, and emulsifying said portion and the remaining aqueous phase, whose salt content is above the critical coagulation concentration, in the oil phase of said food spread.

7. A margarine-like, water-in-oil emulsion food spread comprising at least about 40% fat or oil or mixtures thereof, about 0.1 to about 2% of an emulsifier, an amount of a food grade white pigment effective to cause the optical properties of the food spread, when dehydrated, to be comparable to the optical properties of a freshly made food spread, and the balance water.

8. The food spread defined in claim 7, wherein said white pigment is titanium dioxide.

* * * * *

UNITED STATES PATENT AND TRADEMARK OFFICE
CERTIFICATE OF CORRECTION

PATENT NO. : 4,176,200

DATED : November 27, 1979

INVENTOR(S) : Henricus M. Princen and Michael P. Aronson

Page 1 of 2

It is certified that error appears in the above-identified patent and that said Letters Patent are hereby corrected as shown below:

Column 1, line 67: Delete "precess" and substitute therefore -- process --.

Column 2, line 2: Delete "phenonemon" and substitute therefore -- phenomenon --.

Column 2, line 3: Delete "darkenig" and substitute therefore -- darkening --.

Column 2, line 42: Delete "be" and substitute therefore -- by --.

Column 3, line 12: Delete "referably" and substitute therefore -- preferably --.

Column 5, Table 1, heading of column "$TiO_2$ in Spread" to be changed to -- % $TiO_2$ in Spread --.

Column 5, Table 1, heading of column "Time (hr)" to be changed to -- Time (hrs) --.

Column 5, line 24: Delete "spread" and substitute therefore -- spreads --.

Column 5, Table 2, heading of column "Time (hr)" to be changed to -- Time (hrs) --.

Column 5, Table 3, the results under Visual Rating should be in parentheses i.e. delete "0, +, ++ etc." and substitute therefore -- (0), (+), (++) etc. --.

UNITED STATES PATENT AND TRADEMARK OFFICE
CERTIFICATE OF CORRECTION

PATENT NO. : 4,176,200
DATED : November 27, 1979
INVENTOR(S) : Henricus M. Princen and Michael P. Aronson It is certified that error appears in the above–identified patent and that said Letters Patent are hereby corrected as shown below:

Column 6, line 26: Delete "disapeared" and substitute therefore -- disappeared --.

Column 6, line 53: Delete "good" and substitute therefore -- food --.

Signed and Sealed this

*Fifth* Day of *August 1980*

[SEAL]

*Attest:*

SIDNEY A. DIAMOND

*Attesting Officer*  *Commissioner of Patents and Trademarks*